United States Patent Office 2,895,962
Patented July 21, 1959

2,895,962

EPOXIDIZED ACETALS AND POLYMERS THEREOF

Rudolph F. Fischer, Oakland, Calif., assignor to Shell Development Company, New York, N.Y., a corporation of Delaware No Drawing. Application July 30, 1956
Serial No. 600,696

5 Claims. (Cl. 260—340.7)

This invention relates to novel epoxides, polymers and processes for preparing the same. More particularly, it relates to certain novel epoxidized cyclic acetals of ethylenically unsaturated aldehydes and to polymers thereof.

It is generally known that acetals will hydrolyze in the presence of even the mildest acids. As a result, it has heretofore been believed that almost all reactions involving an acetal in an acidic medium would invariably lead to hydrolysis of the acetal. Indeed, attempts to react linear acetals in acid media for various purposes have been largely unsuccessful because of hydrolysis of the starting material. Nevertheless, it has been felt that a large variety of useful products would be obtained if a method could be devised to react acetals in an acidic medium or otherwise prepare the same products that would result from such reactions. Among such products are novel epoxy resins.

It is, therefore, an object of this invention to provide a process for the reaction of acetals in acid media. More particularly, it is an object of this invention to prepare epoxidized cyclic acetals of unsaturated aldehydes. It is a further object to provide a new class of epoxides of acetals and polymers thereof. It is still another object of this invention to provide a highly useful class of stable polymers of epoxides which may be blended with other resins to produce a low-cost resinous product. Other objects will become apparent as the description proceeds.

These and other objects are accomplished by polyepoxides of polyunsaturated acetals of ethylenically unsaturated aldehydes, the process for preparing them and resins thereof. It has been found that these cyclic products possess many unobvious and beneficial properties which make them particularly useful for many commercial applications. Most unexpected is the discovery that the polyepoxides can be easily prepared in acid medium from the corresponding acetal. As the acetals are cyclic in structure, unexpected stability is imparted to the monomeric epoxide. The ease with which the reactions are conducted, i.e., little or no hydrolysis, results in an economical process. Furthermore, as the starting materials are readily available, the cost of the products is low in comparison to other epoxides.

It has also been found that the above-described epoxides may be polymerized to form polymers which may be utilized, as such, by treatment with certain catalytic materials such as certain metal salts, amines and anhydrides, as described hereinafter. In addition, the polyepoxides may be blended with other epoxides to impart additional stability and lower cost.

The monomeric products of this invention may be described as the epoxidized reaction product of an ethylenically unsaturated aldehyde and a polyhydric alcohol having at least two pairs of hydroxyl groups, each hydroxyl group being not more than three carbon atoms removed from the other hydroxyl group in the pair. Alternatively, the monomers may be termed as polyepoxides of polycyclic acetals since such a product results from epoxidizing the reaction product of the aldehydes and alcohols above-described. The invention may be best understood by first considering the nature of the aldehydes and polyhydric alcohols.

The polyhydric alcohols are those having at least four hydroxyl groups, each hydroxyl group being not more than three carbon atoms from another hydroxyl group. This definition provides for three possible types of configurations: the first being where the hydroxyl groups are on adjacent carbon atoms thus

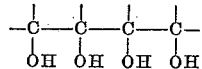

the second being where a carbon atom is present between the carbon atoms bearing the hydroxyl groups, i.e.,

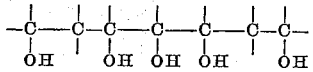

the third configuration is a combination of the first and second, i.e.,

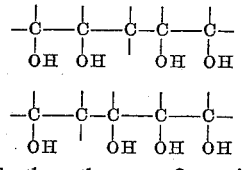

and the like. Further, these configurations also include isomers thereof such as

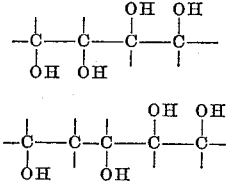

and the like. Among such alcohols are the tetrahydroxy alcohols such as butanetetrol - 1,2,3,4, pentaerythritol, pentanetetrol - 1,2,3,4, pentanetrol - 1,2,4,5, hexanetetrol-1,2,3,4, and the like. Concerning the last compound it will be observed that a polyhydroxy alcohol such as hexanetetrol-1,2,5,6 is likewise within the scope of the invention but compounds such as hexanetetrol-1,2,3,6 do not come within the above definition of the polyhydric alcohol given above. Among the pentahydric alcohols are adonitol, $CH_2OH(CHOH)_3CH_2OH$, and its isomers such as d-arabitol, xylitol, and the like. Among the hexahydric alcohols there may be mentioned sorbitol and its isomers such as mannitol, d-iditol, and the like. A particular advantage of these alcohols is that they are easily reacted with the unsaturated aldehyde.

The unsaturated aldehydes that may be used in the preparation of the novel polycyclic acetals comprise any ethylenically unsaturated aldehyde such as the alpha,-beta-unsaturated aldehydes, i.e., aldehydes having an ethylenic group between two carbon atoms one of which is attached to an aldehyde group,

The aldehyde may be straight chain or cyclic in character and may or may not contain one or more aromatic constituents. In general, aldehydes having not more than 18 carbon atoms in the molecule are preferred. Examples of suitable ethylenically unsaturated aldehydes are acrolein, alpha-isobutyl acrolein, alpha-n-amyl acrolein, alpha-n-hexyl acrolein, and the like. Examples of other unsaturated aldehydes that may be used include, among others, crotonaldehyde, alpha-beta-dimethyl acrolein, alpha-methyl-beta-ethyl acrolein, alpha-methyl-beta-isobutyl acrolein, alpha-ethyl-beta-propyl acrolein, citral, vinyl acetaldehyde, tetrahydrobenzaldehyde, undecylenic aldehyde, and the like. Some of the various types of epoxidized acetals obtained by the epoxidation of the aldehyde-polyol reaction product, may be represented by the following equations:

diallylidenepentaerythritol ⟶
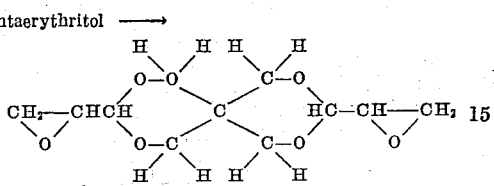

triallylidenesorbitol ⟶
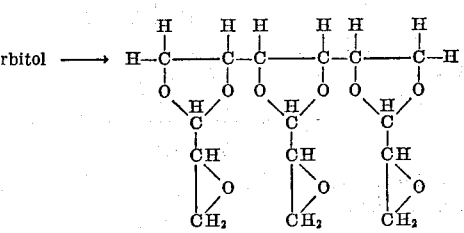

diallylidenebutanetetrol-1,2,3,4 ⟶
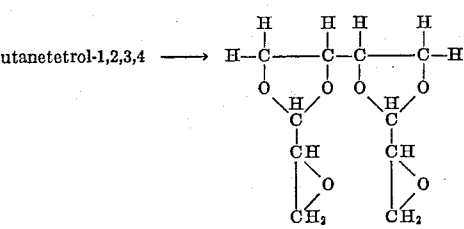

diallylidenepentanetetrol-1,2,3,5 ⟶
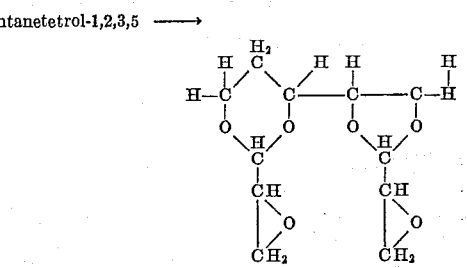

cinnamylidenepentanetetrol-1,3,4,5 ⟶
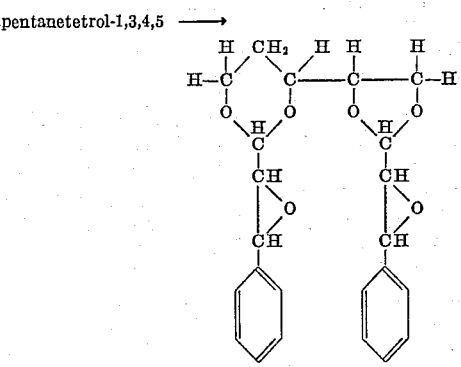

bis-tetrahydrobenzylidenepentaerythritol ⟶
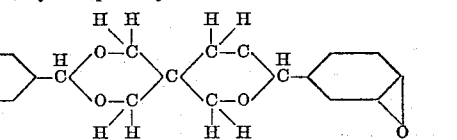

It is found that the substituted products can easily be prepared from an aldehyde and/or alcohol which has a substituent thereon. This is shown by the following typical equation:

diallylidenepentahydroxypentane ⟶
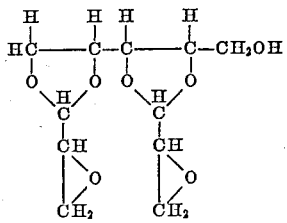

From the foregoing description, it will be observed that the unsaturated compound is formed by the interaction of one mole of the alpha,beta-unsaturated aldehyde for each pair of hydroxyl groups in the polyhydric alcohol with which it reacts. In the actual preparation it is preferred that the unsaturated aldehyde be present in a slight excess in order to obtain maximum yields. Solvents and catalysts may be used as desired. Examples I to V will illustrate methods of preparing the various unsaturated acetals.

*Example I*

To a reaction vessel equipped with a phase separating head, agitator, thermometer, and heating and cooling coils are charged 350 parts of benzene, 136 parts (1 mole) of pentaerythritol, 142.8 parts (2.5 moles) of acrolein, and .3 part of para-toluene sulfonic acid as a catalyst. After all the catalyst dissolves, the temperature is raised with constant agitation, to reflux. When water ceases to be separated, the reaction is complete (in about 3 hours), whereupon the mass is cooled to room temperature. 3 parts of calcium carbonate is added to neutralize the catalyst. The mass is then filtered and stripped of solvent. Upon drying there is obtained 161 parts of diallylidene pentaerythritol, B.P. 93–94° C. (1 mm.).

*Example II*

The procedure of Example I is repeated except that the following are charged to the reaction vessel:

| | Parts |
|---|---|
| Pentaerythritol | 68 |
| Crotonaldehyde | 77 |
| Benzene | 220 |
| p-Toluene sulfonic acid | 0.1 |

After about 3 hours, 17.5 parts of water is separated. The solution is neutralized with calcium oxide and then filtered and stripped of the solvent. The residue is Claisen distilled at 1 mm. and yields 114 parts of impure product, B.P. 142–172° C., and 7 parts of residue. The impure product is crystallized from petroleum ether and identified as dicrotonylidene pentaerythritol, M.P. 51–52° C., having the following analysis:

| | Calculated for $C_{13}H_{20}O_4$ | Found |
|---|---|---|
| C | 65.1 | 64.9 |
| H | 8.3 | 8.4 |
| Br No | 133 gm./100 gm. | 131.0 |

*Example III*

The procedure of Example I is repeated except that the following are charged to the reaction vessel:

| | Parts |
|---|---|
| Sorbitol | 182 |
| Acrolein | 195 |
| Benzene | 440 |
| Petroleum ether | 108 |
| p-Toluene sulfonic acid | .35 |

After refluxing for 6 hours, 54 parts of water are formed and after 8 hours, 59 parts of water are formed. The reaction mass is cooled to room temperature whereupon about .5 part of calcium oxide is added to neutralize the mixture. Thereafter, the solvents are stripped and the residue is Claisen distilled to yield 99 parts of a viscous liquid boiling within the range of 135 to 145° C. and .5 mm. This product is redistilled and the cut within the range of 144 to 151° C. at .9 mm. is identified as triallylidene sorbitol.

|   | Calculated for $C_{15}H_{20}O_6$ | Found |
|---|---|---|
| C | 60.8 | 60.7 |
| H | 6.8 | 6.9 |
| Br No | 162 gm./100 gm. | 158 gm./100 gm. |

Example IV

The procedure of Example I is repeated except that the following are charged to the reaction vessel:

Pentaerythritol _____ 136 parts (1 mole).
Tetrahydrobenzaldehyde _____ 220 parts (2 moles).
p-Toluene sulfonic acid _____ 1 part.
Benzene _____ 265 parts.

The mixture is refluxed, with constant agitation, under a phase-separating head until water ceases to be evolved. About 3.5 hours are required. Thereafter, 2 parts of sodium carbonate is added to the reaction vessel and agitation is continued for a few hours. The reaction mixture is then filtered to remove excess sodium carbonate followed by removal of the solvent by distillation. There remains 333 parts (100% yield) of a crystalline product having a melting point of 90° C. The product is recrystallized from methanol which raises the melting point to 97° C. The product is identified as bis(tetrahydrobenzylidene)pentaerythritol having the following analysis:

|   | Calculated for $C_{19}H_{28}O_4$ | Found |
|---|---|---|
| C | 71.5 | 71.3 |
| H | 8.8 | 8.8 |

Example V

The procedure of Example IV is repeated except that an equivalent of undecylenic aldehyde replaces the tetrahydrobenzaldehyde. The product is identified as diundecenylidenepentaerythritol.

The epoxidation of the acetals of the polyethylenically unsaturated aldehyde may be accomplished by reacting the unsaturated reactant with an epoxidizing agent. Organic peracids, such as performic acid, peracetic acid, perbenzoic acid, monoperphthalic acid, peroxytrifluoroacetic acid and the like, are preferred agents for this reaction.

The amount of the epoxidizing agent employed will vary over a considerable range depending on the nature of the starting material. In general, one should employ at least one mole of the epoxidizing agent for every ethylenic group to be epoxidized. Thus, to produce the diepoxide of diallylidenepentaerythritol from diallylidenepentaerythritol, one should react the latter with at least two moles of an organic peracid as peracetic acid. In some cases, it is rather difficult to effect epoxidation of all the ethylenic groups and if a completely epoxidized product is required, additional epoxidizing agent and/or more vigorous reaction conditions may be required. This may be illustrated by the triepoxidation of triallylidene sorbitol.

It is preferred to carry out the epoxidation reaction in a suitable mutual solvent for the reactants and product. Chloroform is an especially useful solvent for the purpose, but other materials such as ethyl ether, dichloromethane, benzene, ethyl acetate and the like, may be used.

The temperatures employed during the epoxidation may vary over a considerable range depending on the type of reactants and the peracid selected. In general, reaction temperatures will range from —20° C. to 100° C. but it is preferred that the temperatures range from about —10° C. to about 25° C. As the number of ethylenic double bonds increases, longer reaction times are usually required. Atmospheric, superatmospheric, or subatmospheric pressures may be employed as desired. Because the reaction is exothermic, it may be necessary to employ cooling means to keep the temperature of the reaction mixture within the preferred range.

The epoxidized products obtained by this method may be recovered by any conventional means such as distillation, extraction, fractional precipitation, and the like.

An alternative method for epoxidizing the ethylenically unsaturated acetals comprises first treating with a hypohalous acid such as hypochlorous acid and then with a dehydrohalogenating agent such as sodium hydroxide.

The polymerization of the polyepoxides may be accomplished by the use of various curing techniques. One method comprises curing them in the presence of organic amines. Particularly preferred are primary and secondary amines such as diethylenetriamine, ethylenediamine, 2,2,4-tri(dimethylaminomethyl)-phenol, and the like. Tertiary amines may also be used but they are not preferred as they do not cure as well. The primary and secondary amines are used in stoichiometric amounts so that about one hydrogen atom is provided for each epoxy group. If a tertiary amine is used, amounts ranging from .1% to 5% of the polymer are usually adequate.

Another method for curing the polyepoxides is by the use of an anhydride catalyst such as maleic, succinic, itaconic, chlorendic, and the like. Such catalysts are used in an amount so as to provide about one anhydride group for each epoxy group. Other methods for curing the polyepoxides comprise the use of such acid curing agents as p-toluene sulfonic acid, ethylsulfonic acid, chloroacetic acid, hydrobromic acid, sulfuric acid, and the like, also salts as zinc sulfate, monosodium sulfate, and the like.

In all cases, it is required that the polyepoxide be cured at temperatures ranging from about 50° C. to about 250° C. for one to 4 hours. In most cases, however, the temperatures range from 100 to 200° C.

To illustrate the manner in which the invention may be carried out, the following examples are given. It is to be understood, however, that the examples are for the purpose of illustration and the invention is not to be regarded as limited to any of the specific materials or conditions recited therein. In the examples, the quantities of the ingredients are expressed in parts by weight unless otherwise indicated.

Example VI

To a reaction vessel equipped with an agitator, reflux condenser, thermometer, inlet, heating and cooling coils, is added the following:

|   | Parts |
|---|---|
| Diallylidenepentaerythritol | 53.0 |
| Chloroform | 75.0 |
| Peracetic acid (45%) in acetic acid | 92.0 |

The temperature is raised to and maintained at 60° C. until substantially all the active oxygen from the peracetic acid is consumed as indicated by thiosulfate titration. The reaction mixture is neutralized by washing with a dilute solution of sodium bicarbonate after which it is dried, filtered and stripped of solvent to yield 55 parts of crude product. Claisen distillation at 2 mm. yields the following fractions:

| Fraction | Temperature (° C.) | Yield (parts) |
|---|---|---|
| 1 | 107–141 | 10 |
| 2 | 141–147 | 10 |
| 3 | 147–171 | 5 |
| 4 | 171–178 | 11 |
| Bottoms | | 11 |

Fractions 1, 2, and 3 mainly represent recovered starting material, monoepoxide and a mixture of the mono- and diepoxide, respectively. The fourth fraction is redistilled and found to contain mainly the diepoxide of diallylidenepentaerythritol having the following analysis:

| | Theory | Found |
|---|---|---|
| B. P. | | 176° C. (1 mm. Hg) |
| C, percent | 54.2 | 55.1 |
| H, percent | 6.6 | 6.7 |
| Epoxide value eq./100 g. | 0.82 | .67 |

Example VII

The procedure of Example VI is repeated except that dicrotonylidenepentaerythritol acetal is used to produce the diepoxide thereof which is insoluble in chloroform and carbon tetrachloride but is soluble in warm methanol.

Example VIII

To a reaction vessel equipped as in Example VI are charged 74 parts of triallylidene sorbitol, 150 parts of 45% peracetic acid and 100 parts of benzene. After reacting and working-up as in Example VI, the bottoms contains the triepoxide of triallylidene sorbitol.

Example IX

To a reaction vessel equipped as in Example VI are charged 200 grams (0.625 mole) of the reaction product of Example IV and 400 ml. of chloroform. With constant agitation, a 40% solution of peracetic acid is dropped in over a period of 45 minutes. Cooling is applied throughout to maintain the temperature at about 10° C. After several hours, the reaction mixture is washed twice with sodium bicarbonate solution followed by a single washing with water. The product is then dried over magnesium sulfate followed by filtering and stripping of the solvent. The residue is a colorless, viscous liquid identified as the diepoxide of bis-tetrahydrobenzylidenepentaerythritol. It has an acidity of less than 0.001, an ester value of 0.081 eq./100 grams and an alpha epoxy value of 0.491 eq./100 grams.

Example X

The procedure of Example IX is repeated except that an equivalent amount of diundecylidenepentaerythritol replaces the tetrahydrobenzylidenepentaerythritol to yield a product identified as the diepoxide of undecenylidenepentaerythritol.

The following examples illustrate methods for polymerizing the monomeric polyepoxides.

Example XI

To 272 grams of the diepoxide of dicrotonylidenepentaerythritol of Example VII is added 196 grams of maleic anhydride. A solid cast polymer is obtained after 3 hours at 150° C.

Example XII

To 244 grams of the diepoxide of diallylidenepentaerythritol is added 41 grams of diethylenetriamine. Upon curing for 4 hours at 200° C. a solid casting is obtained.

Example XIII

To 344 grams of the triepoxide of triallylidenesorbitol is added 45 grams of ethylene diamine. After curing a casting for 3 hours at 150° C. a solid cast polymer is obtained.

Example XIV 100 grams of the diepoxide of bis-tetrahydrobenzylidenepentaerythritol are mixed with 76 grams of hexahydrophthalic anhydride. The mixture is cured at 100° C. for 2 hours followed by 4 additional hours at 125° C. The casting has a Barcol hardness of 51, 34 and 15 at room temperature, 100° C. and 150° C., respectively. After boiling in acetone for 3 hours, the weight increased only about 1%.

Similar results are obtained by curing the diepoxide of undecenylidenepentaerythritol.

I claim as my invention:

1. The diepoxide of diallylidenepentaerythritol.
2. The diepoxide of dicrotonylidenepentaerythritol.
3. The diepoxide of bis(tetrahydrobenzylidene)pentaerythritol.
4. The triepoxide of triallylidenesorbitol.
5. A polycyclic acetal polyepoxide selected from the group consisting of

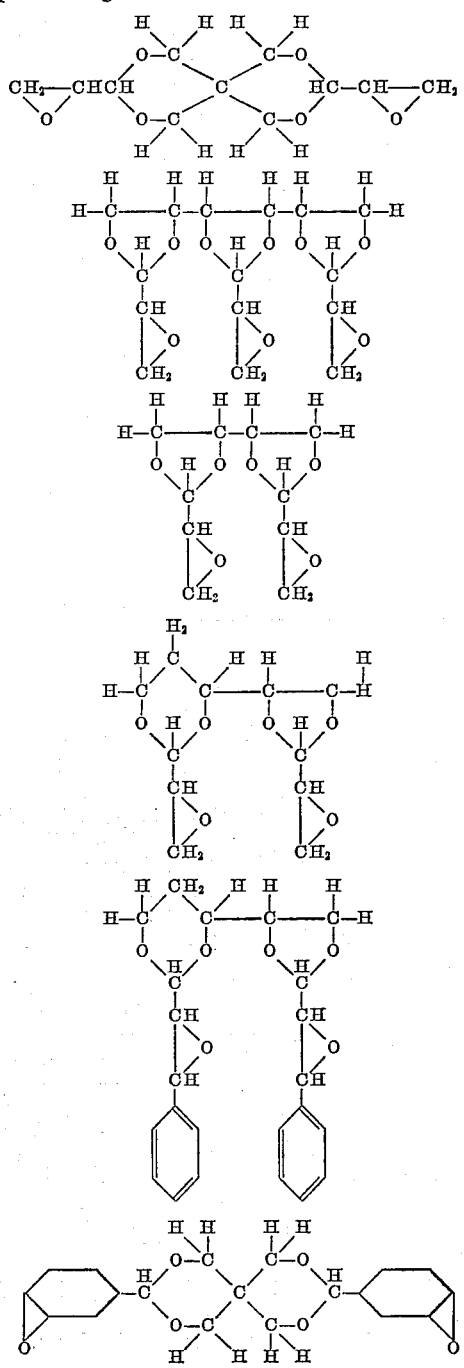

(7) 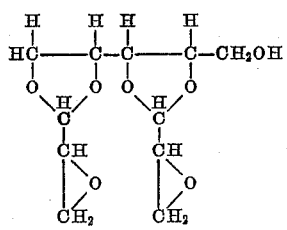
(8) 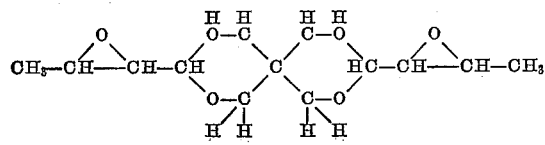
References Cited in the file of this patent
UNITED STATES PATENTS
| | | |
|---|---|---|
| 2,187,006 | Alvorado et al. | Jan. 16, 1940 |
| 2,302,626 | Koster | Nov. 17, 1942 |
| 2,457,328 | Swern et al. | Dec. 28, 1948 |
| 2,541,670 | Segall | Feb. 13, 1951 |
| 2,555,500 | Morehouse et al. | June 5, 1951 |
OTHER REFERENCES
Read: J. Chem. Soc., vol. 101, pp. 2091–2094 (1912).
Schulz et al.: Angewandte Chemie, vol. 62, No. 5, pp. 113–118 (1950).